United States Patent [19]

Friedman et al.

[11] Patent Number: 4,710,769

[45] Date of Patent: Dec. 1, 1987

[54] TRANSMIT-SECURE NON-BLOCKING CIRCUIT-SWITCHED LOCAL AREA NETWORK

[75] Inventors: Lee G. Friedman, Croton-on-Hudson; Brent T. Hailpern, Katonah; Lee W. Hoevel, Yorktown Heights; Yannick J. Thefaine, Beacon, all of N.Y.

[73] Assignee: IBM Corporation, Armonk, N.Y.

[21] Appl. No.: 815,358

[22] Filed: Dec. 30, 1985

[51] Int. Cl.$^4$ ............................................ H04Q 11/04
[52] U.S. Cl. ............................... 340/825.030; 370/58; 370/67; 340/825.7
[58] Field of Search .............. 340/825.03, 825.5, 825.7, 340/825.01; 370/85, 60, 58, 63, 67

[56] References Cited

U.S. PATENT DOCUMENTS

| | | | |
|---|---|---|---|
| 4,417,244 | 11/1983 | Melas | 340/825.03 |
| 4,470,140 | 11/1984 | Coffey | 370/86 |
| 4,494,193 | 1/1984 | Brahm et al. | 364/200 |
| 4,589,106 | 5/1986 | Prather et al. | 370/58 |
| 4,601,029 | 7/1986 | Hargrave et al. | 370/67 |
| 4,633,245 | 12/1986 | Blount et al. | 340/825.03 |
| 4,639,910 | 1/1987 | Toegel et al. | 370/58 |
| 4,674,083 | 6/1987 | Rackin | 370/67 |

Primary Examiner—Donald J. Yusko
Attorney, Agent, or Firm—Pollock, Vande Sande & Priddy

[57] ABSTRACT

A switching system or local area network is non-blocking, transmit-secure and employs a star type topology. A back plane uses $n(n-1)$ bus lines to interconnect n ports. Each port can transmit on any one of $n-1$ bus lines depending on the identity of the destination port. Likewise, each port can receive from any of $n-1$ bus lines, depending on the identity of the transmitting port. Signalling as well as data flow on the same bus lines. Each of the ports includes a dedicated microprocessor along with an arbitrator to resolve contention. The ports further have transmit and receive multiplexers coupled between the back plane and an associated work station or information source/sink.

9 Claims, 6 Drawing Figures

REMOTE PORT Y ATTEMPTS TO CALL THIS PORT X :
(ARBITRATOR HAS REPORTED A SIGNAL FROM Y)

4,710,769

TRANSMIT-SECURE NON-BLOCKING CIRCUIT-SWITCHED LOCAL AREA NETWORK

DESCRIPTION

1. Field of the Invention

The invention relates to a switching arrangement for interconnecting a plurality of work stations, and more particularly, a switching arrangement which is both non-blocking and transmit secure.

2. Background Art

Communication technology is replete with apparatus and techniques to provide for communication between digital devices such as work stations, where a work station may be a stand-alone computer or an intelligent terminal. The characteristics of these various interconnection or communication devices vary in dependence on the requirements for the particular application. In general, the communication field can be divided into circuit switched systems akin to the telephone system or some type of shared media (TDMA, CSMA) which are of more recent vintage. The present invention is particularly directed to the problem of interconnecting a number of intelligent work stations which are assumed to be physically close to one another (for example within a building). In the particular problem solved by the invention, one of the prime characteristics is a requirement for transmit security, that is providing a system in which it is difficult or impossible for a given work station to "listen" to a conversation to which it is not a party. More particularly, if work station A is communicating with work station B, then there should be no hardware or software modifications that can be effected solely within work station C to gain access to conversation between work stations A and B.

Based on this characteristic, the invention employs a physical circuit switch, i.e. the invention discards shared media systems such as those described in Coffey U.S. Pat. No. 4,470,140 or Brahm et al U.S. Pat. No. 4,494,193. It is a characteristic of shared media systems that they are neither transmit nor receive secure, since any work station with access to the media has access to all the signals passing on that media.

In accordance with the invention, a connection established between two communicating work stations uses a dedicated direct physical link between them. As a result, there are no layers of protocol or hardware required to "weed out" or filter data packets of information which are not addressed to one of the work stations involved in the given conversation. As a consequence of the direct and dedicated physical link employed in the conversation, other work stations cannot delay or prevent transmission on this link. This characteristic is of particular importance for real time and graphics applications. Another consequence of the direct, dedicated physical link employed in a particular conversation is the ability to employ simple protocols and programming for the network interface.

A communications system must be capable of not only handling the passage of data back and forth between communicating work stations, but also of addressing issues raised in the connection establishment and disestablishment phase of the conversation. In accordance with the present invention the connection establishment phase is non-blocking and interference free. For example, if work station A is attempting to contact work station B, and no other work station (such as a work station C) is trying to contact work station B, then work station A will contact work station B without any delay by the switching system. Furthermore, the communication phase of the switching system is non-blocking and interference free. That is, if work station A is involved in communicating with work station B, then no other work station (such as a work station C) can interfere with or delay the conversation between work stations A and B.

In accordance with the invention, each work station or transceiver) is associated with a port and the switching system or communications system is capable of connecting any one of a plurality of n transceivers to any other of a plurality of transceivers, where n is an integer greater than 1. The invention employs a plurality of dedicated bus lines, a different dedicated bus line for each different pair of the transceivers. A port is provided for each transceiver, each port includes $2(n-1)$ terminals, each coupled to a different one of the bus lines. In this fashion, there is a different, dedicated bus line for communication between any given work station A and any other given work station B. In order to establish communication between these work stations, the switch, when it receives a request, merely connects the port associated with work station A, to that bus line which is dedicated for the transmission of information between work stations A and B, in order to direct the information or data provided by the work station A to work station B. For bidirectional communication, the same port connects that different bus line which is dedicated for transmission between work station B and work station A to a receive terminal for work station A, so that information transmitted by work station B will be received at work station A.

For n work stations, $n(n-1)$ bus lines are required. In accordance with the invention, the $n(n-1)$ bus lines are provided in the form of a back plane. The switch also includes n ports, one for each work station. When a port receives a request from its associated work station to establish communication with a specified work station, a selection is made of the appropriate dedicated bus line, for both-transmitting from the work station and receiving at the work station. The port then generates and transmits the necessary connection establishment signals over the dedicated bus line. At the conclusion of the connection establishment phase, the port provides for switching between the back plane and the associated work station. The port is also sensitive to connection disestablishment or disconnecting signals for disconnecting the work station to the back plane through the port.

Thus the invention provides, in one aspect:

a non-blocking, transmit secure switching system for connecting any one of a plurality of n transceivers to any other of a plurality of transceivers, where n is an integer greater than 1, a plurality of dedicated bus lines, a different pair of dedicated bus lines for each different pair of said transceivers, a port associated with each transceiver, each port including $2(n-1)$ terminals, each coupled to a different one of said bus lines, each port further including switching means for connecting said associated transceiver with at least a selected one of said terminals.

In accordance with another aspect the invention provides:

apparatus for interconnecting a number of n intelligent work stations, each with a respective port for controlling the transmission and reception of data thereby, comprising:

back plane means, comprising n(n−1) bus lines for transmitting data signals between said ports, each said port being connected to each of said other ports by a separate one of said lines for transmitting and a separate one of said lines for receiving said signals, means for controlling the transmission from and to respective work stations, said controlling means comprising:

first means for selecting appropriate sets of transmitting and receiving lines in accordance with the set of work stations to be connected, second means for generating connection establishment signals and transmitting said connection establishment signals over said appropriate set of transmitting and receiving lines between said set of work stations, third means for switching the data signal transmissions between said set of work stations to said appropriate set of transmitting and receiving lines upon connection establishment, and fourth means for disconnecting said switching means from said appropriate set of transmitting and receiving lines when said data signal transmissions end.

BRIEF DESCRIPTION OF THE DRAWINGS

The present invention will now be further described in the following portions of this specification to enable those skilled in the art to make and use the same, when taken in conjunction with the attached drawings in which like reference characters identify identical apparatus and in which.

DETAILED DESCRIPTION OF PREFERRED EMBODIMENTS

Figure 1:
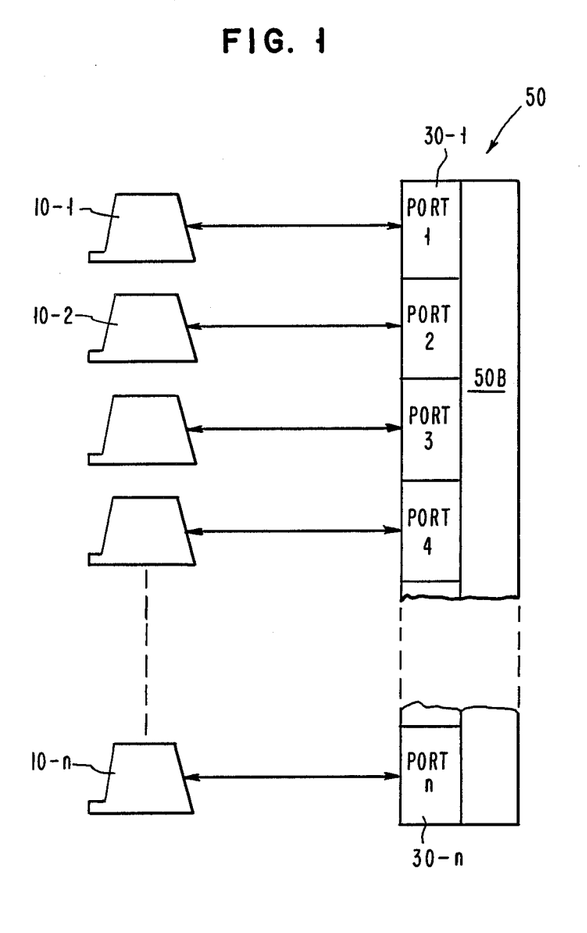
FIG. 1 is a block diagram showing a typical application for the present invention.

FIG. 1 shows a plurality of work stations 10, e.g. work stations 10-1 through 10-n are particularly illustrated. Each of these stations (sometimes referred to as intelligent terminals or transceivers) can communicate with any other of the work stations through the switching network 50. The switching network 50 includes a port 30 dedicated to each of the different work stations such that there are ports 30-1 through 30-n. The switching network 50 further includes a back plane 50B which provides for interconnecting the various ports. It is a prime object of the invention to provide for a transmit secure switching network such that if work station 10-1 is engaged in communication with work station 10-n, then there is no way for work station 10-2 (or for any other work station) to have access to the conversation between the work stations 10-1 and 10-n, regardless of any modifications to either the hardware or software at the third party terminal 10-2.

Figure 2:
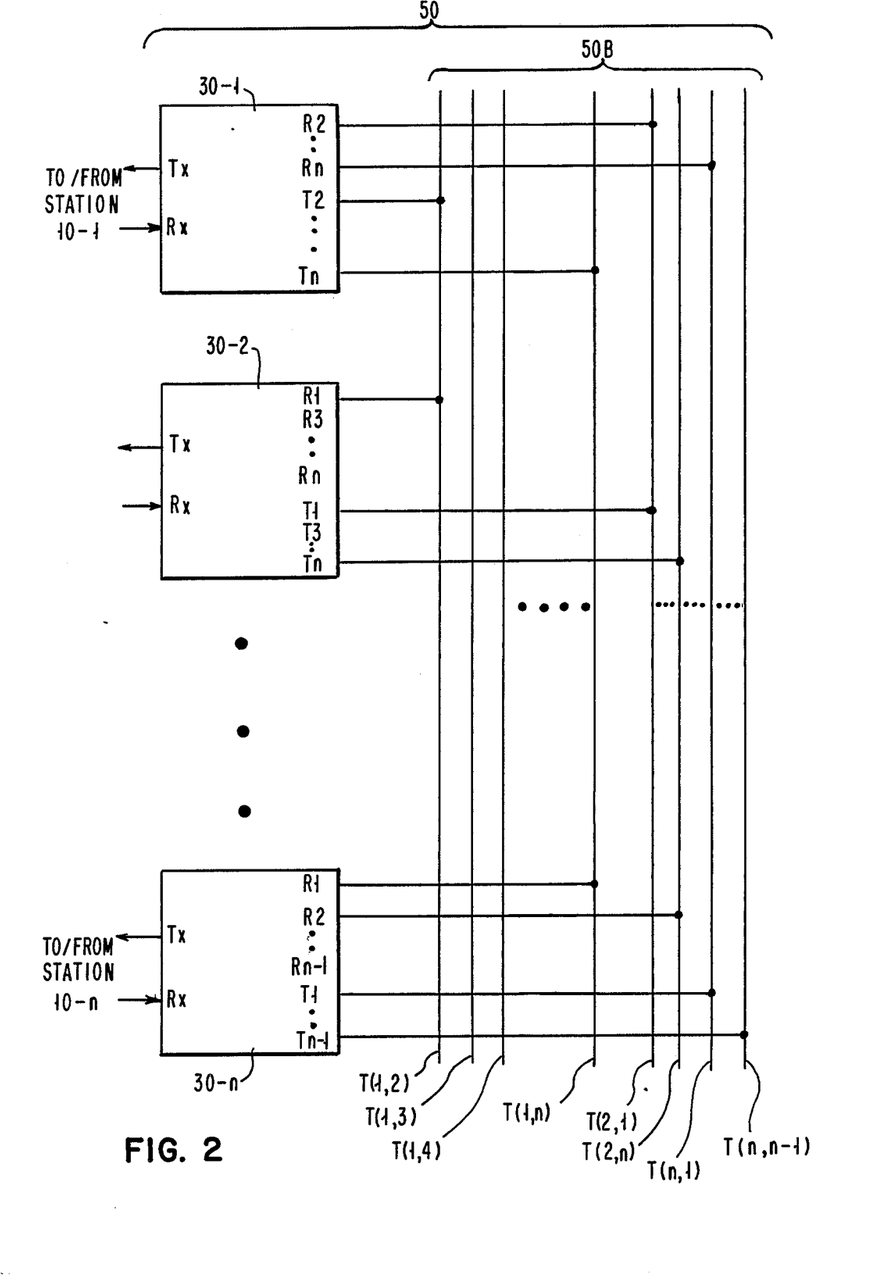
FIG. 2 illustrates the switching network in more detail.

FIG. 2 shows the switching network 50 in more detail. As has been indicated, there is a port 30 for each work station. Each port includes Tx and Rx terminals coupled to the work station such that digital signals appearing at the terminal Tx will be received at the associated work station, and on the other hand digital signals generated by the work station will be received at the port, at the terminal Rx. The typical port 30 includes a number of other terminals, in particular 2(n−1) terminals. Half of these other terminals are receive terminals, for receiving information from the dedicated bus lines to be described, and the other half (the other n−1) terminals are provided for transmitting information over a selected one of the dedicated bus lines. The back plane is shown in diagrammatic fashion in FIG. 2, not all of the bus lines are specifically illustrated. There are n(n−1) bus lines, a different bus line for transmissions between each different pair of ports. As will be seen in FIG. 2 the nomenclature employed to "name" the bus lines is T(a,b), where a designates the port which is transmitting and b designates the port which is receiving. It should be understood that this particular nomenclature is merely a matter of convenience, and there are many other nomenclatures that could have been used. An advantage of the nomenclature can be illustrated by focusing in on particular bus line T(1,2). It will be seen that this particular bus line is connected to the T2 terminal of port 30-1, and is also connected to the R1 terminal of port 30-2. Thus assuming that the port 30-1 provides a connection between the Rx terminal and its T2 terminal, and port 30-2 provides a connection between its R1 terminal and its Tx terminal, then information received from work station 1 (at the Rx terminal of port 30-1 which is connected to terminal T2) will be received at terminal R1 of port 30-2. By reason of its own internal connection, the same information will appear at terminal Tx of port 30-2, and in this fashion information originating at the work station 1 will be received at the work station 2. At the same time, and assuming there is a need for bidirectional communication, and further assuming that the port 30-1 connects its terminal R2 to its terminal Tx, and port 30-2 connects its terminal T1 to its terminal Rx, then information transmitting by the work station 2 will be received at the work station 1. This bidirectional communication then uses two dedicated bus lines, e.g. bus line T(1,2), for transmitting from terminal 1 to terminal 2, and the different dedicated bus line T(2,1) for transmitting from terminal 2 to terminal 1. Although each of the other ports in the switch 50 is in near proximity to these particular bus lines, there is no other port in the switch 50 which has access to bus lines T(1,2) and T(2,1) and thus there is no way for any other work station to access bus lines T(1,2) or T(2,1). Inasmuch as the signals passing between the stations 1 and 2 appear on no other bus line, transmit security is provided.

In a particular embodiment of the invention, the switching network 50 is housed within a chassis which includes, in addition to the back plane 50B and the several ports 30, a power supply. Both signalling and data transfer employ the back plane. In this particular embodiment, the chassis could be a PC expansion chassis, and for a 64 bus line back plane, eight ports are supported, permitting eight work stations to be connected to the switching network 50. While more than eight ports per switch 50 are possible, this would require a more sophisticated allocation of the lines of the back plane or an additional mother board in the expansion chassis.

In general for n ports, n(n−1) bus lines are used for signalling and data transmission. Each port can selectively transmit on any one of n−1 lines. Each line is connected to one of the other n−1 ports. Similarly, each port can selectively listen to any one of the n−1 transmissions directed to it.

Each port communicates with its work station via a RS-422SDLC communication link (for example; clearly other standards could be employed, as well). On command from the associated work station, the port:
1. selects the appropriate bus line for transmission and reception,
2. signals the remote port, by transmitting flags on the transmit line,
3. waits for an acknowledgement from the remote port (or times out),
4. sends a verification acknowledgement, and
5. permits the work station to use the switch.

When a port detects a communication request, the port:
1. selects the appropriate transmission and reception lines,
2. sends an acknowledgement, requesting verification that an OPEN (a communication request from a remote port) was initiated,
3. waits for the verification (or times out), and
4. informs its associated work station of the connection, permitting the work station to use the switch 50.

While the work station is engaged in transmitting to a remote work station, its port listens to the transmissions of the work station for a CLOSE (a command to terminate communications) message. Upon observing a close command, the port disconnects the work station from the switch 50. Note that the port does not buffer the work station's communications, it talks to the work station and controls the link to the other ports.

Because a port has no control over scheduling communications, the possibility exists of simultaneous or overlapping requests for communication. Accordingly, a port arbitrator is provided. The port arbitrator:
1. provides for parallel monitoring of the reception lines that it is connected to,
2. provides for individual masking of lines,
3. provides for a vectored interrupt or polled response to lines,
4. provides for fixed or rotating prioritized response to lines,
5. provides for programmable slope detection on lines (the ability to determine just what types of lines transitions will be detected),
6. provides arbitrator functioning under firmware control,
7. provides for arbitration of concurrent requests, and
8. provides for queuing of multiple requests.

Figure 3:
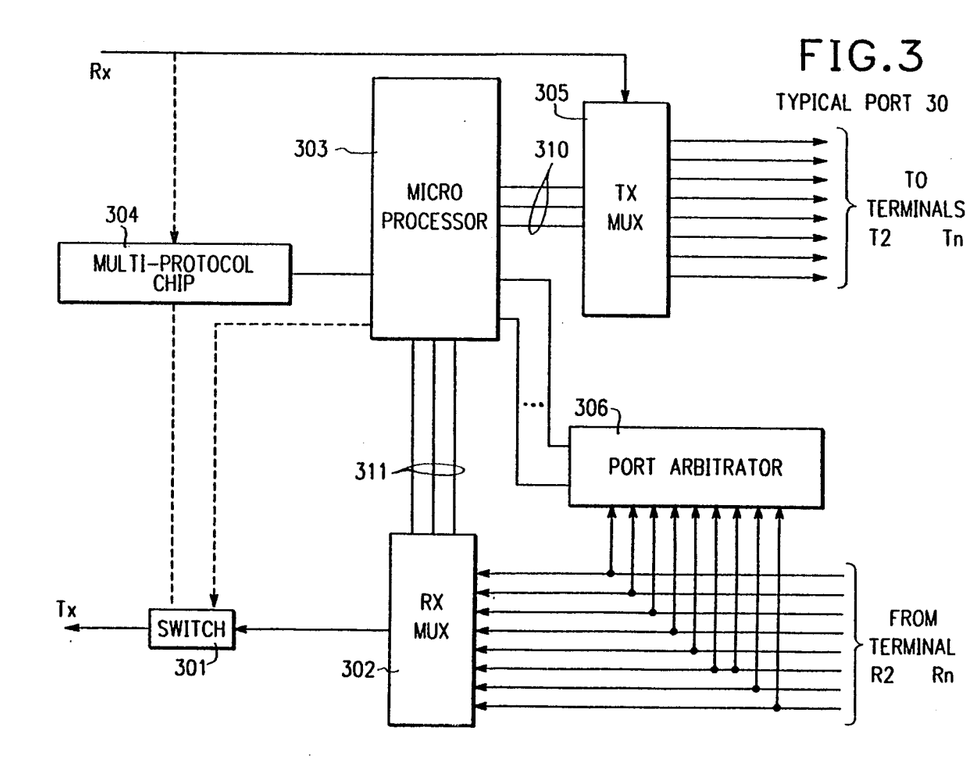
FIG. 3 is a block diagram of a typical port 30.

The block diagram of a typical port 30 is shown in FIG. 3. As shown, the terminal Rx is coupled to TXMUX 305. The TXMUX 305 is controlled in turn by the microprocessor 303 via control lines 310. The output of the TXMUX 305 is coupled to the transmitting terminals of the port, such as the terminals T2 ... Tn for port 30-1. Of course, in use TXMUX 305 couples its input (from Rx) to a selected one of the transmit terminals T2-Tn. On the other side, the terminals R2 ... Rn of the port 30-1 are coupled as inputs to a RXMUX 302 and a port arbitrator 306. The RXMUX 302 is also controlled by the microprocessor 303 via control lines 311. In use RXMUX couples a selected one of the receive terminals R2-Rn to the switch 301. The port arbitrator 306 may be an edge sensitive device that monitors (in parallel) all receive terminals. As will be described below, the arbitrator 306 can be implemented by an interrupt controller, such as an AMD, AM9519A or Intel 8259. In general a caller (or port) sends flags on its transmit line (dedicated to the particular destination port) in order to initiate a call. When the receiving arbitrator 306 detects a potential caller, it passes the calling port ID to the microprocessor 303. Because the arbitrator 306 might consider noise as being a valid transmission, the microprocessor 303 goes through a handshake protocol, which has already been described. The handshake protocol could be eliminated if a reliable test for "receiving flags" is available from the multi-protocol chip 304. In that case only one level of acknowledgement (as opposed to the acknowledgement and verification which are described above) is required. This reliable feature is found in the Intel MPSC. Switch 301 is provided to enable the work station to receive, and as indicated it is also controlled by the microprocessor 303. The multi-protocol chip 304 is a serializer/-deserializer converting 8- or 16-bit data bytes or words from the processor to a sequence of data bits to be transmitted on the data line. Similarly it converts a sequence of bits from a receive line to a byte or word. It also provides for timing synchronization and error detection protocols for packing bit sequences into data packets.

When call establishment is completed, the microprocessor 303 controls the TXMUX 305 to pass data received from the Rx terminal to a specified one of the transmit terminals, that particular one of the transmit terminals which corresponds to the port associated with the work station to which the transmissions are being directed. Likewise, the microprocessor 303 controls the RXMUX 302 to couple that specific one of the receive terminals (identified with the port associated with the work station from which information is expected) through the switch 301 to the Tx terminal.

Figure 4:
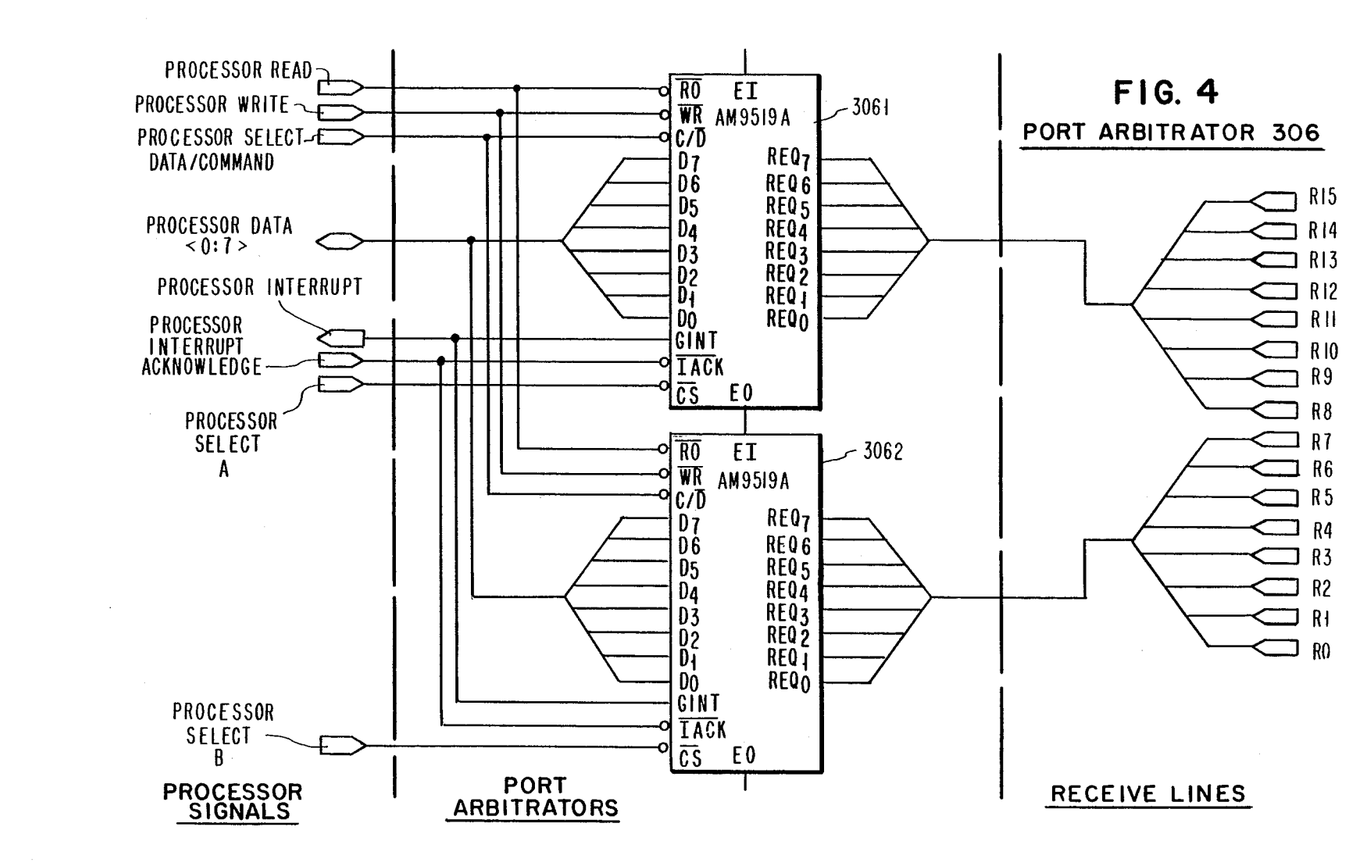
FIG. 4 is a more detailed block diagram of the port arbitrator element of the typical port 30.

FIG. 4 shows a detailed block diagram of one particular embodiment of the port arbitrator 306. The port arbitrator is comprised essentially of the AMD9519A, and includes chips 3061 and 3062. The use of two chips allows for a 16-way arbitrator. This can be expanded to serve more than 16 lines by cascading additional controllers. The interrupt request pins $REQ_0$ through $REQ_7$ of chip 3061 and similar pins of the chip 3062 are each coupled to a different one of the receive lines R0 through R15. Of course if there are eight or less receive terminals (such as shown in FIG. 3), then chip 3062 can be eliminated. The chips include, in addition, PROCESSOR-READ, PROCESSOR-WRITE, PROCESSOR INTERRUPT ACKNOWLEDGE, PROCESSOR SELECT A, PROCESSOR SELECT B, PROCESSOR SELECT DATA/COMMAND terminals as well as PROCESSOR DATA (0:7). The PROCESSOR-READ is used by the microprocessor 303 to read the registers in the arbitrator 306. The PROCESSOR-WRITE is used by the microprocessor 303 to initialize the arbitrator 306, mask requests, identify requests, etc. The DATA/COMMAND is used to address control structures in the arbitrator 306. PROCESSOR DATA attaches the arbitrator 306 to the data bus of the microprocessor 303. The PROCESSOR INTERRUPT is used to attach the arbitrator 306 for interrupt type operations at the port.

The chips 3061 and 3062 include a plurality of registers, and in particular an interrupt request register, an interrupt service register, and interrupt mask register and a response memory. The interrupt request register is an 8-bit register in which a bit is set when the corresponding request line is set. The interrupt service register indicates pending interrupts and indicates all lower level interrupts are disabled. The interrupt mask register is used to mask individual interrupt levels. The response memory is a 32×8 read/write memory. It stores up to four bytes of response for each request line.

The AMD9519A provides for different control structures in order to provide a variety of paradigms for the port arbitrator. The different control capabilities include:
1. priority mode—either fixed (such as for example $REQ_0$ is the highest, $REQ_7$ is the lowest) or rotating using a round robin schedule,
2. vector selection—more particularly, an individual vector can be selected and used to implement special routines for particular ports, or a common vector can be used to call the connection establishment routine for all ports,
3. REQ polarity—this sets the controller to respond to either active high or active low inputs.

In operation, depending upon the control structure selected, when a receive line is activated (either high or low) one of the two operations will ensue:
1. an interrupt is generated to the port controller 303, or
2. an interrupt service register bit is set (particularly for polled mode operation).

In either event, the port controller 303 will receive a vector corresponding to the calling port. The controller 303 can then lock out all other request lines on the arbitrator 306 and follow the normal connection establishment procedure. The port connection establishment protocol will now be described in connection with the flow charts represented by FIGS. 5 and 6.

Figure 5:
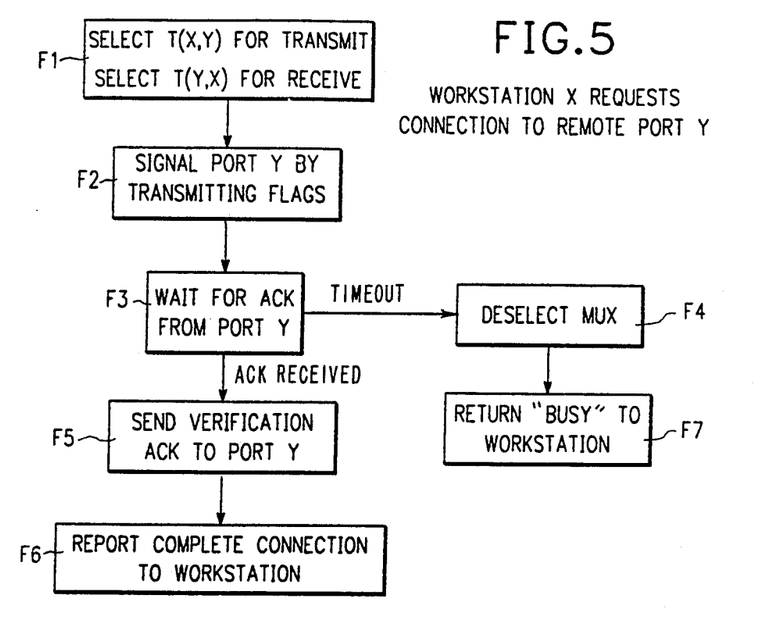
FIGS. 5 and 6 are flow charts depicting port protocols.

FIG. 5 is a flow diagram of the steps effected at a typical port, such as port x (associated with a work station x) when the associated work station x requests connection to a specified port Y. The work station x manifests its desire to communicate with work station y. The work station x places appropriate signals on the line coupled to the port's Rx terminal. These signals are sensed by the multiprotocol chip 304 (see FIG. 3) to stimulate the microprocessor 303. The microprocessor 303 then effects function F1. Function F1 selects a particular line of the bus for the transmission and reception functions. If, as we have assumed, we are illustrating the functions carried out at the port x when the work station x desires to communicate with work station y, then the transmit line to be used is T(x,y) and the receive line to be used is T(y,x). Function F1 is carried out by controlling the TXMUX 305 and the RXMUX 302. Function F2 then transmits a flag to the port y (over the conductor T(x,y)). Function F3 is a delay for receipt of an acknowledgement from port y. The acknowledgement will be received on the line T(y,x) at the RXMUX 302 and it will be transmitted to the microprocessor 303 via the lines 311. Assuming that the acknowledgement is received, then function F5 sends a verification (a further flag, message or packet) to port y. Function F6 then merely reports, to the work station x, that its connection to the desired work station y has been completed.

On the other hand, if the acknowledgement from port y is not received, then after an appropriate time out period function F4 is effected to deselect (or reverse) the controls implemented at function F1. Function F7 returns a busy to the work station x informing the work station that work station y is not available.

If the connection was successfully completed, the work station x is enabled to communicate with the work station y. These communications (on the transmit side) flow to the terminal Rx of the port x associated with work station x, through the TXMUX 305 (via the already established connection to the specified terminal), onto the selected line of the back plane (see FIG. 2) which is coupled only to one of the receive terminals of the port y. In the reverse direction (for communication from the work station y to the work station x) information is placed on a different, dedicated line T(y,x) by one of the transmit terminals of the port y. The only other connection to this particular dedicated line T(y,x) is one of the receive terminals of the port x. This particular receive terminal has been enabled to be coupled through the RXMUX 302 by the selection procedure of function F1. The information then flows through the switch 301 to the Tx terminal of the port x and then to the work station x. It should be apparent from the foregoing that there is no buffering involved. The port does, however, monitor the information or messages being passed between the work stations x and y for the presence of a close command. This close command will appear at either or both of the TXMUX 305 or RXMUX 302. On recognizing such a command, the microprocessor 303 deselects or reverses the selections effected by function F1 to thereby disconnect the port x (and the work station x) from the back plane 50B.

Figure 6:
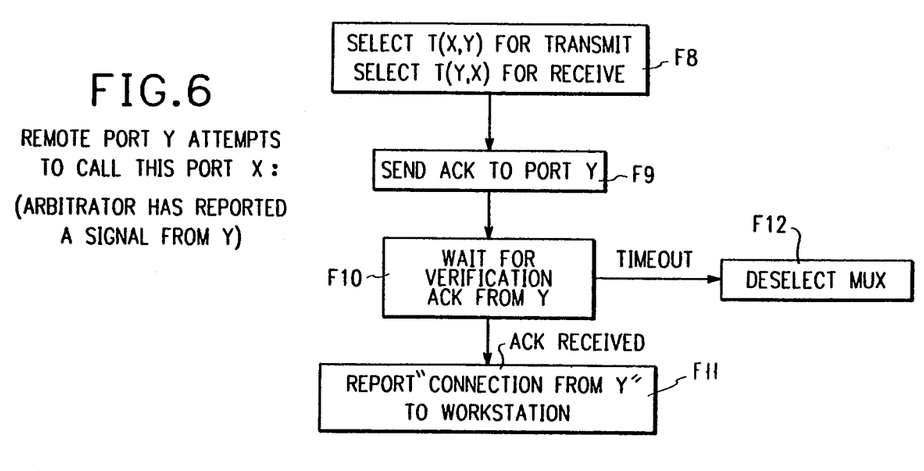

FIG. 6 illustrates the flow chart effected by the microprocessor 303 at a typical port x, when a remote port Y attempts to call the port x. This attempt is manifested by a flag appearing on one of the receive terminals of the port x. Since the receive terminals are connected to the arbitrator 306, the presence of the flag can be detected by the port arbitrator 306. This detection is communicated to the microprocessor 303. At this point, the microprocessor 303 is informed of the identity of port Y (and of course it knows its own identity) and therefore it can effect function F8, to select the appropriate transmit and receive terminals. Note that the same terminals are selected at function F8 as are selected at function F1; this is a consequence of the fact that there is one and only one line in the back plane 50B for the transmission of information from port x to port Y, and only one but a different line for the transmission of information from port Y to port x.

Function F9 sends an acknowledgement to port Y (over T(x,y)) acknowledging receipt of the flag which stimulated the performance of function F8. Function F10 then waits for a verification acknowledgement from port Y. Assuming that is received, then function F11 reports a connection to work station Y, to its associated work station, work station x.

On the other hand, if the verification acknowledgement from port Y is not received prior to the time out, then function F12 deselects (reverses) the selection effected by F8.

Once port connection is established, communications flow in an unbuffered fashion between the connected ports. The port monitors the flow for a close command. On receipt of a close command a function similar to F2 is effected. During a particular call the port will not acknowledge another call request. Thus the invention provides for a non-blocking, transmit secure switch to interconnect the plural work stations.

It should be apparent that a particular embodiment of the invention has been described. Various changes will be apparent to those skilled in the art which are within the spirit and scope of the invention which is to be construed in accordance with the following claims.

Having thus described our invention, what we claim as new, and desire to secure by Letters Patent is:

1. A non-blocking, transmit secure switching system for connecting any one of a plurality of n transceivers to any other of said plurality of transceivers, wheren is an integer greater than 1,
   a plurality of dedicated bus lines, a different pair of dedicated bus lines for each different pair of said transceivers,
   a port associated with each transceiver, each port including 2(n−1) terminals, each coupled to a different one of said bus lines, and
   each port further including switching means for connecting said associated transceiver with at least a selected one of said terminals.

2. The switching system of claim 1 wherein said switching means connectes said associated transceiver with two of said terminals for bidirectional communications.

3. The switching system of claim 1 in which said port includes arbitrator means coupled to n−1 terminals of said port for responding to requests to engage in communication appearing on any of said n−1 terminals.

4. Apparatus for interconnecting a number of n intelligent work stations each with a respective port for controlling the transmission and reception of data thereby, comprising:
   back plane means, comprising n(n−1) bus lines for transmitting data signals between said ports, each said port being connected to each of said other ports by a separate one of said lines for transmitting and a separate one of said lines for receiving said signals,
   means for controlling the transmission from and to respective work stations, said controlling means comprising:
   first means for selecting appropriate sets of transmitting and receiving lines in accordance with a set of work stations to be connected.
   second means for generating connection establishment signals and transmitting said connection establishment signals over said appropriate set of transmitting and receiving lines between said set of work stations,
   third means for switching the data signal transmissions between said set of work stations to said appropriate set of transmitting and receiving lines upon connection establishment, and
   fourth means for disconnecting said switching means from said appropriate set of transmitting and receiving lines when said data signal transmissions end.

5. The apparatus of claim 4 wherein:
   said third means includes a first multiplexer for connecting data signals received from said work station to a first selected one of said bus lines, and a second multiplexer for connecting data signals from a second selected one of said bus lines to said work station,
   and wherein said port further includes means responsive to a selection, by said first means, for controlling said third means in identifying said first and said second selected bus line.

6. The apparatus of claim 4 which further includes:
   arbitrator means responsive to a plurality of said bus lines for indicating a connection establishment request receiver over any of said plurality of bus lines.

7. The apparatus of claim 6 wherein said arbitrator means is programmable.

8. The apparatus of claim 4 in which each of said work stations is associated with a dedicated port and in which each said dedicated port includes:
   a transmit multiplexer coupled between said work stations and a selected set of said bus lines,
   a receive multiplexer coupled between said work stations and a different selected set of said bus lines, and
   control means coupled to both said transmit and receive multiplexers for controlling the same.

9. The apparatus of claim 8 in which said control means includes a processor and an arbitrator, said arbitrator also coupled to said different selected set of said bus line.

* * * * *

UNITED STATES PATENT AND TRADEMARK OFFICE
CERTIFICATE OF CORRECTION

PATENT NO. : 4,710,769

DATED : December 1, 1987

INVENTOR(S) : Friedman et al

It is certified that error appears in the above-identified patent and that said Letters Patent is hereby corrected as shown below:

Col. 9, line 5, "wheren" should be --where n--.

Col. 10, line 25, "receiver" should be --received--.

Signed and Sealed this

Third Day of May, 1988

Attest:

DONALD J. QUIGG

*Attesting Officer*  *Commissioner of Patents and Trademarks*